Jan. 12, 1932.  A. W. PRIEBE  1,840,330
APPARATUS FOR ELECTRIC ARC WELDING PIPE
Filed Aug. 26, 1929
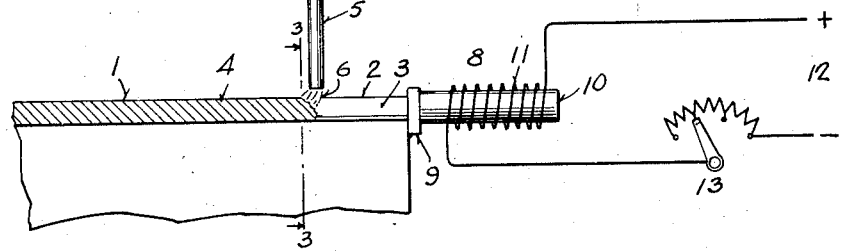
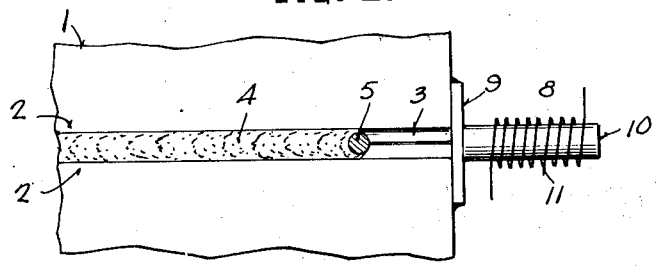
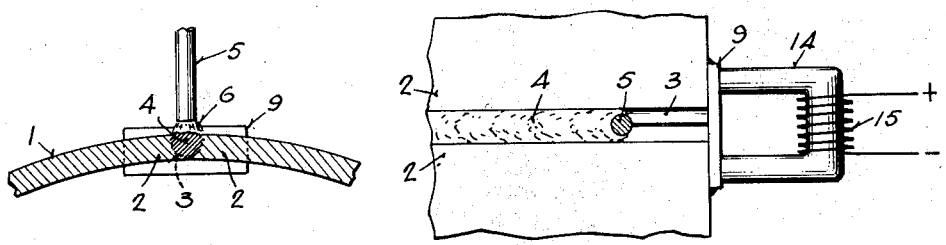
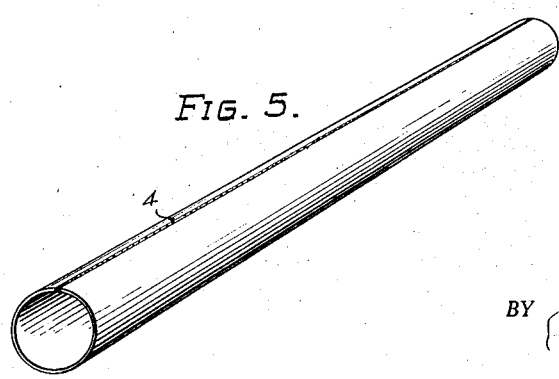
INVENTOR.
Arthur Priebe
BY
ATTORNEY.

Patented Jan. 12, 1932

1,840,330

UNITED STATES PATENT OFFICE

ARTHUR W. PRIEBE, OF MILWAUKEE, WISCONSIN, ASSIGNOR TO A. O. SMITH CORPORATION, OF MILWAUKEE, WISCONSIN, A CORPORATION OF NEW YORK

APPARATUS FOR ELECTRIC ARC WELDING PIPE

Application filed August 26, 1929. Serial No. 388,366.

This invention relates to an apparatus for electric arc welding and is particularly applicable to the welding of longitudinal seams in tubular articles, such as pipe.

The magnetic conditions set up in the tubular article, due to the passage of electric current from the weldrod through the article, have been found to have a definite effect upon the character and control of the arc and the quality of the seam resulting therefrom. The longitudinal position of the weldrod with respect to the tubular article has a definite bearing on the magnetic conditions set up within the article.

As a result thereof, it was heretofore difficult to properly control the arc so as to effect a seam having the desired quality when the weldrod was in the region adjacent the ends of the article. The arc at such times becomes unsteady and tends to flutter which makes it difficult to deposit the metal within the welding groove and to effect the required penetration of the arc in the groove to accomplish the desired weld.

One of the objects of the invention is to overcome the detrimental effect of the magnetic flux conditions in the article when the electrode is in the regions adjacent the ends thereof.

Another object is to provide a method of arc welding a longitudinal seam in a tubular article whereby a uniform weld throughout the length of the article may be effected.

Another object of the invention is to provide an apparatus for carrying out the purposes before-mentioned.

The invention is illustrated in its preferred embodiment in the accompanying drawings in which:

Figure 1 is a side elevation of the pipe illustrating diagrammatically the manner of carrying out the welding operation.

Fig. 2 is a plan view.

Fig. 3 is a section taken on line 3—3 of Fig. 1.

Fig. 4 is a view similar to Fig. 2 showing a modification of the invention.

Fig. 5 is a perspective view of the finished pipe.

In the drawings, the numeral 1 indicates a pipe blank which is preferably formed from sheet metal and has its side edges 2 in longitudinal alignment to provide a welding seam. The edges 2 are preferably chamfered in any suitable manner to provide a welding groove 3 for receiving fused welding metal 4.

The welding metal 4 is deposited from a metallic weldrod 5 by means of an electric arc 6 established between the end of the weldrod and the respective edges to be welded. The weldrod is preferably fed toward the work by suitable automatic feeding mechanism 7 which operates in response to the changes in the characteristics of the arc.

In order to overcome the detrimental effects due to the adverse magnetic flux conditions when the welding is being effected adjacent the ends of the pipe, the invention provides a magnetic member 8 which is preferably maintained in abutment with an end plate 9 forming a dam for the welding groove as is shown in Figure 1.

The magnetic member shown comprises a central core 10 having an electrical coil 11 wound thereabout which coil is connected to a suitable electrical source 12 for energizing the magnet. A rheostat 13 or other suitable means is provided for regulating the amount of current flowing through the coil so as to adjust the amount of magnetic flux set up thereby.

In the modification, shown in Fig. 3, the magnetic member comprises a yoke 14 having the ends thereof abutting the end plate 9 on opposite sides of the seam. The central portion of the yoke is provided with a coil 15 connected to a suitable current source as before described in connection with Figure 1.

The magnetic conditions set up by the coil adjacent the ends function to counteract the adverse magnetic flux conditions set up by the welding operation so that a seam of the desired quality may be effected at the ends of the tubular article.

The invention may have various other modifications and embodiments within the scope of the accompanying claims without departing from the applicant's invention.

What is desired to be protected by Letters Patent is:

1. In an apparatus for electric arc welding tubular articles, an electro-magnetic member seated against an end of the tubular article adjacent the seam to be welded to correctively alter the magnetic flux conditions at the end of the seam, and means for controlling the magnetic strength of said member.

2. In an apparatus for electric arc welding tubular articles, an electro-magnetic member one pole of which is seated against an end of the tubular article adjacent the seam to be welded to correctively alter the magnetic flux conditions at the end of the seam, and means for controlling the magnetic strength of said member.

3. In an apparatus for electric arc welding tubular articles, an electro-magnetic member the poles of which are seated against an end of the tubular article adjacent the seam to be welded to correctively alter the magnetic flux conditions at the end of the seam, and means for controlling the magnetic strength of said member.

In testimony whereof I have hereunto signed my name at Milwaukee, Wisconsin, this 22nd day of August, 1929.

ARTHUR W. PRIEBE.